United States Patent [19]

Hodson

[11] Patent Number: 5,136,675
[45] Date of Patent: Aug. 4, 1992

[54] SLEWABLE PROJECTION SYSTEM WITH FIBER-OPTIC ELEMENTS

[75] Inventor: James M. Hodson, Port Orange, Fla.

[73] Assignee: General Electric Company, Philadelphia, Pa.

[21] Appl. No.: 631,236

[22] Filed: Dec. 20, 1990

[51] Int. Cl.⁵ .............................................. G02B 6/06
[52] U.S. Cl. .................................. 385/116; 359/630; 385/147; 434/44
[58] Field of Search ............... 350/96.10, 96.24, 96.25, 350/96.26, 169, 170, 174; 434/43, 44; 359/630; 385/115–117, 147

[56] References Cited

U.S. PATENT DOCUMENTS

| | | | |
|---|---|---|---|
| 4,439,157 | 3/1984 | Breglia et al. | 350/174 X |
| 4,439,755 | 3/1984 | LaRussa | 434/44 X |
| 4,634,384 | 1/1987 | Neves et al. | 434/44 |
| 4,709,985 | 12/1987 | Takeuchi | 385/116 |
| 4,714,428 | 12/1987 | Bunker et al. | 434/43 |
| 4,969,707 | 11/1990 | Hopkins | 385/116 |
| 4,983,015 | 1/1991 | Bourguignat et al. | 385/116 |

*Primary Examiner*—John D. Lee
*Attorney, Agent, or Firm*—Geoffrey H. Krauss

[57] ABSTRACT

A slewable projection system of the type having a relatively high-resolution area-of-interest (AOI) scenic portion inset into and blended with a relatively low-resolution field-of-view (FOV) scenic portion of greater areal extent than the high-resolution portion, includes: at least one optical element for providing the low-resolution background image portion; at least one other optical element for providing the high-resolution AOI image portion; an optical combiner receiving the low-resolution and high-resolution image portions; optics for projecting the combined image onto a viewing area; and at least one fiber-optic cable having a multiplicity of fibers for interconnecting the combining element and at least one of the two image optics portions and the projecting optics. A fiber-optic element can mechanically decouple the combining and projecting elements, so that high projection slew rates and accelerations can be realized, while also eliminating hard optics associated with image de-rotation and/or focusing. Another fiber-optic element can provide moveable area-of-interest blending at any selected location over the entire area of the background scene, without movement of a projector or other high-pass subassembly. Use of yet another fiber-optic element can facilitate dynamic image merging.

11 Claims, 2 Drawing Sheets

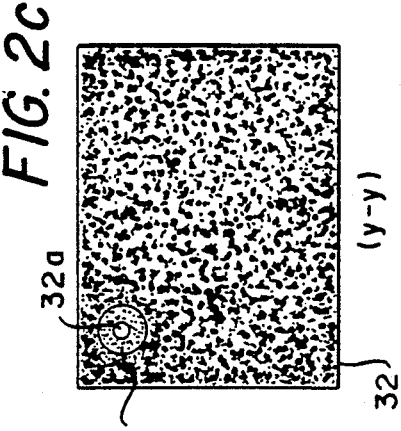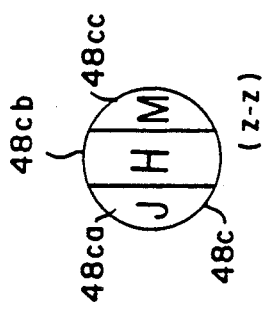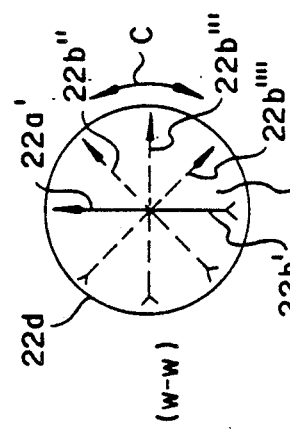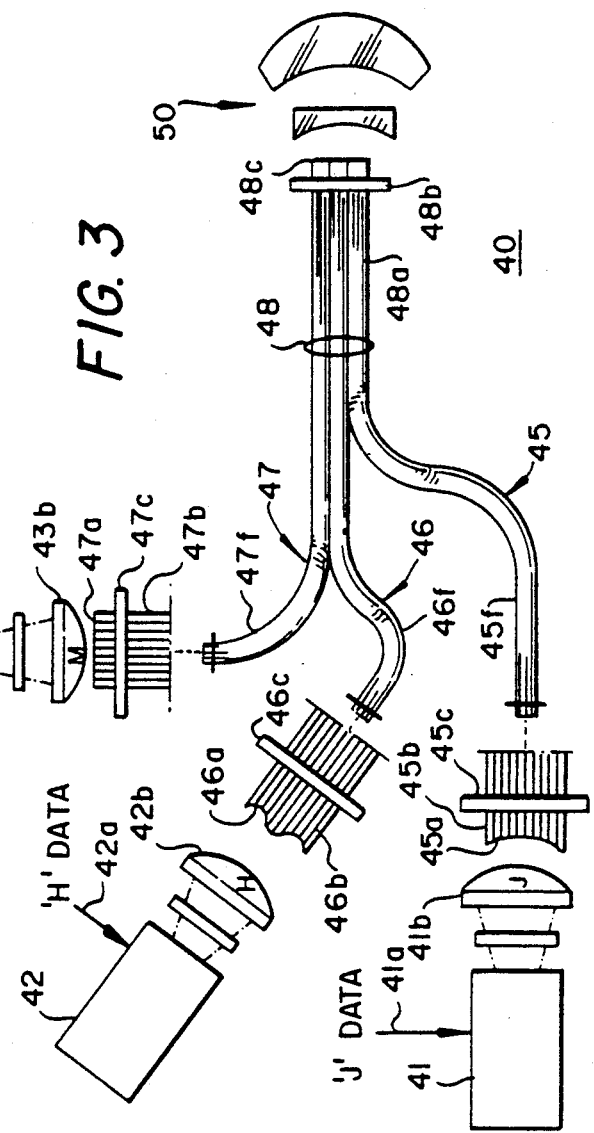

SLEWABLE PROJECTION SYSTEM WITH FIBER-OPTIC ELEMENTS

FIELD OF THE INVENTION

This invention relates to computer image generated (CIG) display systems and, particularly, to a novel display system utilizing fiber-optic elements. The invention is most advantageously employed in an area-of-interest (AOI) display system, typically employed in a domed training device, wherein a wide field of view is provided with a limited high-resolution area at a point along the eye line-of-sight of the person utilizing the dome display system.

BACKGROUND OF THE INVENTION

It is now well known to utilize an area-of-interest display system in which an area of high definition, along the line-of-sight of the person utilizing the system, is inset and blended into a hole "cut out" of a background image portion of lesser definition; this approach is described and claimed in U.S. Pat. No. 4,634,384 issued Jan. 6, 1987, assigned to the assignee of the present invention and incorporated herein in its entirety by reference, as in U.S. Pat. No. 4,714,428, also assigned to the assignee of the present invention, issued Dec. 22, 1987, and describing and claiming methods of distortion correction in a CIG system. Reference to '384 patent will show a slewable projection system having an optical assembly in which several relatively complex lens groups are entrained with a variety of prisms, utilized for image rotation, azimuth and elevation slewing, multiple focusing, image combination, field and/or relay purposes. While not specifically shown in the '384 patent, those skilled in the art readily understand that a relatively complex mechanical assembly is required to hold and maintain the various hard optical elements with great positional stability over fairly wide ranges of several environmental factors (movement, temperature, vibration and the like). It is highly desirable to reduce the cost and complexity of this hard-optics projection system. It is also highly desirable to provide the possibility for additional imaging system features, such as multiple image mosaics, dynamic image overlay and the like, especially if such additional features can be provided at the same time that the cost and complexity of the lesser-featured system are being simultaneously reduced.

BRIEF SUMMARY OF THE INVENTION

In accordance with the invention, a slewable projection system of the type having a relatively high resolution area-of-interest (AOI) scenic portion inset into and blended with a relatively low-resolution field-of-view (FOV) scenic portion of greater areal extent than the high-resolution portion, includes: at least one means for providing the low-resolution background image portion; at least one means for providing the high-resolution AOI image portion; means for combining the low-resolution and high-resolution image portions; means for projecting the combined image onto a viewing area; and fiber-optic means for interconnecting the combining means and at least one of the providing and projecting means.

In a presently preferred embodiment, a fiber-optic element mechanically decouples the combining and projecting means, so that high projection slew rates and accelerations can be realized, while also eliminating hard optics associated with image de-rotation and/or focusing. Another fiber-optic element provides moveable area-of-interest blending at any selected location over the entire area of the background scene, without movement of a projector or other high-mass subassembly. Another fiber-optic element can facilitate dynamic image merging and the like advantages.

Accordingly, it is an object of the present invention to provide an improved slewable AOI CIG display system utilizing at least one fiber-optic element.

This and other objects of the present invention will become apparent to those skilled in the art, upon reading the following detailed description of the invention, when considered in conjunction with the associated drawings.

BRIEF DESCRIPTION OF THE DRAWINGS

FIGS. 2a, 2b and 2c are diagrams showing images viewable at various points of interest in the system of FIG. 1;

FIG. 3 is a partially-schematic block diagram of a portion of another AOI CIG display system according to the invention, and illustrating use of a multiple image mosaic assembly having a plurality of fiber-optic elements; and FIG. 3a is a diagram illustrating an optical pattern viewable within the assembly of FIG. 3.

DETAILED DESCRIPTION OF THE INVENTION

Figure 1:
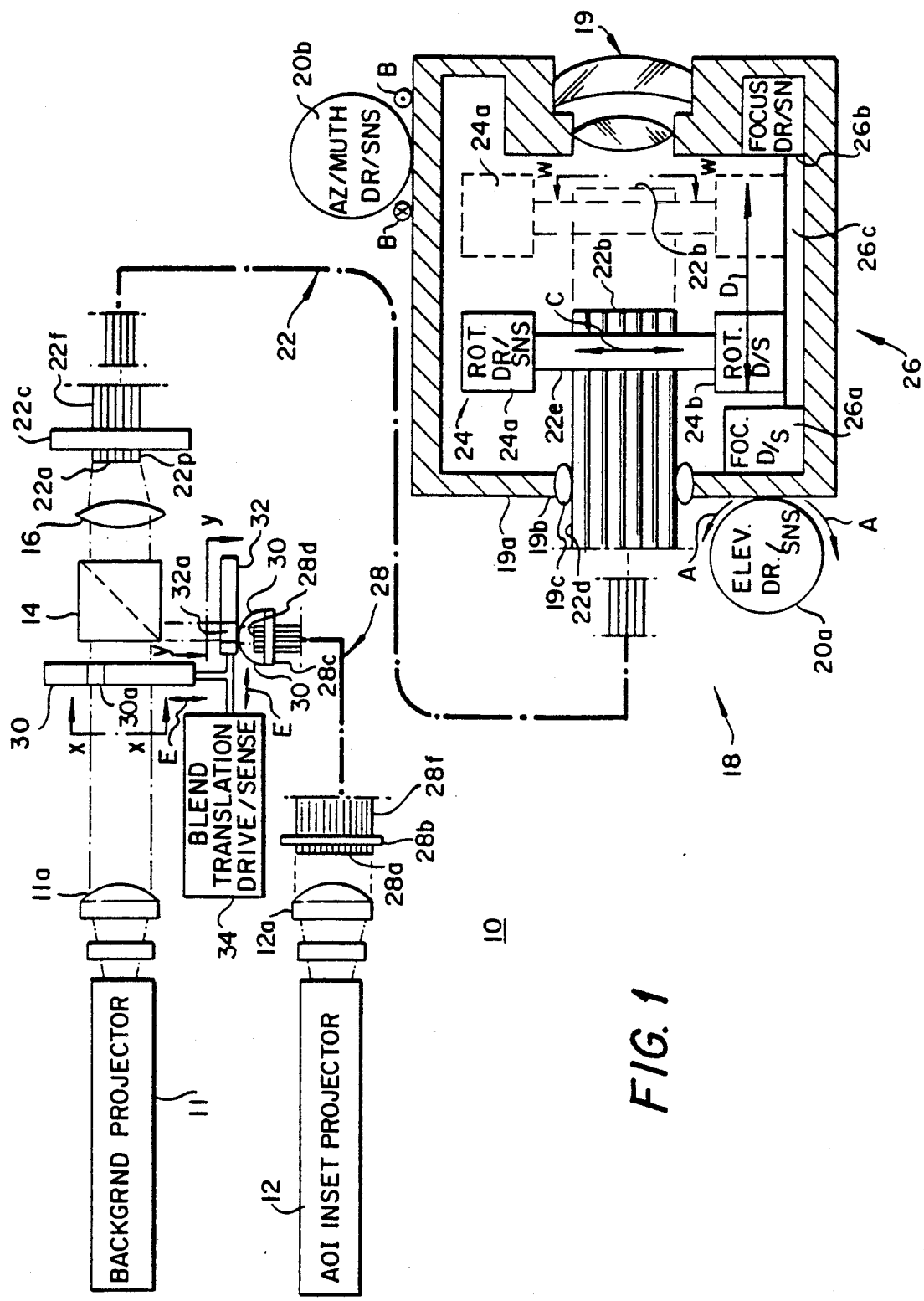
FIG. 1 is a partially-sectionalized block view of the applicable portions of a AOI CIG display system according to the invention.

Referring now to FIG. 1, a display source and servo/optical assembly 10 (somewhat analogous to the assembly 40 shown in FIG. 3 of the aforementioned U.S. Pat. No. 4,634,384,) is shown. Apparatus 10 includes a background projection means 11 and an area-of-interest (AOI) projection means 12 for forming an image of a high-resolution area to be inset into the relatively low-resolution scene projected from projection lens 11a of the background projector. An optical combination means 14, such as a beamsplitter and the like, receives the background scene illumination from lens 11a, and the inset area illumination from projector means 12a, and provides the blended illumination via a common relay means 16, such as a lens and the like, to servo'd optical means 18. This means 18 includes a projection lens means 19, within a housing 19a which is slewed and moved in elevation (as shown by arrows A) by an elevation drive/sense means 20a and in azimuth (as shown by arrows B, into and out of the plane of the drawing) by an azimuth drive/sense means 20b, to allow a blended scene to be projected upon a viewable area.

In accordance with one aspect of the present invention, the combined optical image from beamsplitter 14 is relayed by lens means 16 to the input surface 22a of a fiber-optic element 22. The image is passed along flexible fiber-optic element 22 and appears at the output 22b thereof, for projection through lens means 19. The fiber-optic element 22 comprises a bundle of optical fibers 22f, each having a proximal end 22p maintained and positioned by a first fixing means 22c. Each fiber 22f also has a distal end 22d which passes through an aperture 19b in the projection housing 19a (and may be buffered therefrom by a resilient washer 19c and the like) and ends at the output surface 22b. Another clamping means 22e fixes the fiber distal ends substantially permanently into a fixed positional relationship. It will be seen that the image illumination projected into input surface 22a is emitted out of output surface 22b, even as the projection head 18 is slewed through all combinations of elevation and azimuth, due to the flexible nature of the fiber-optic element 22. This flexible fiber-optic element 22 needs a minimum of mechanical support along its length and effectively removes the necessity for precision optical elements, such as the fold mirror 62 and half-angle mirror 64, normally needed between the beamsplitter and the projection lens, as shown in FIG. 3 of the aforementioned '384 patent.

Prior art systems typically required a de-rotation prism (shown as optical element 60 and FIG. 3 of the aforementioned '384 patent), to remove image rotation engendered by slew of the servo'd optics. This relatively costly optical subassembly, and its required precision mounting assembly, are not required in my novel AOI system; while not required in this invention (because no rotation will be induced by a non-existent gimballed mirror assembly) a rotational drive/sensing means 24 (which may be unitary or comprise a plurality of portions, e.g. a pair of rotational DR/SNS portions 24a and 24b) may be provided if it is desired to cause the distal end 22d of the fiber-optic element in fixing ring 22e to rotate, in the direction of arrows C about the axis of the fiber-optic element in surface 22b, and thus rotate the orientation of the output image, with respect to the orientation of the image input at surface 22a. The image rotation property is further shown in FIG. 2a, in which the view in the direction of arrows W—W (towards the fiber-optic element output surface 22b) is shown; the individual fiber-optic elements 22f are not shown, as these elements will typically be of very small diameter, and a multiplicity (at least several thousand) of these elements will be combined in each element "cable" 22 to transport a coherent image. It should be understood that, while the fiber-optic element is shown with a circular cross-section or input/output face configuration, other symmetric or asymmetric shapes can be as equally well utilized. Regardless of the cross-sectional geometry selected for a particular use, if the illumination provided to the input surface 22a has a particular orientation (as illustrated by the exemplary arrow 22a') in a head-up vertical orientation, rotation of distal end ring 22e can cause the output surface 22b illumination to have an orientation exactly duplicating the input and illumination orientation (as shown by image arrow 22b', identical with input arrow 22a'), or at some rotational offset (as shown by rotated arrows 22b'', 22b''', 22b'''' and so forth). Thus, if rotation drive sense means 24 is originally indexed for 0 rotation (as represented by arrow 22b'), some initial rotation in a first selected direction (say 30 in the clockwise direction) causes the input information 22a' to exit as rotated output information 22b''. Further rotation (say through a total angle of about 90 clockwise) causes input information 22a' to exit with another output orientation 22b'''. The total amount of rotation (through at least 360, if required) will be determined by the particular use.

In accordance with another principle of the present invention, projection focusing is carried out by movement of the fiber-optic element distal surface 22b to a desired location between a first limit position 22b, furthest from projection lens means 19, and a second limit position 22b', closest to projection lens means 19, by use of focusing means 26. Focusing means 26 includes a focus sense means, having one or more sensor components 26a/26b, and a movement means 26c actuated by components 26a/26b for moving the ring-rotation means 24, and its associated fiber-optic element retaining ring 22e (with cable distal end 22d attached) toward or away from projection lens means 19, in the direction of arrows D. Thus, fiber cable movement means 26 does not have to move any mirrors or other precision optical components (such as a projection lens means 19 itself) nor is movement of the entire projection head means 18 required; consequently, focus means 26 may be of less cost and complexity than the focus means previously utilized in an AOI CIG display system.

In accordance with another aspect of the present invention, even if fiber-optic element 22 is not utilized, another fiber-optic element 28 can advantageously be utilized to provide even greater flexibility in the blending of high-definition inset visual information into a relatively low-definition background scene. As taught in the '384 patent, the background scene illumination is passed through a background (BG) intermediate image filter which is substantially transparent, except in the area of an outtake blockage region 30a as seen in the direction of arrows X—X, (see FIG. 2b) which is advantageously surrounded by a transition region 30b of decreasing transmission as opaque 30a is approached. Another (AOI) intermediate image filter 32 is substantially opaque as seen in the direction of arrows Y—Y, (see FIG. 2c) except for a substantially transparent area 32a, of size and shape substantially complimentary to opaque area 30a and intermediate filter 30; area 32a is surrounded by an increasingly-transmissive transition region 32b, which is substantially complimentary to increasingly-opaque transition area 30b. By having the center of the areas 30a and 32a coincide in an image combined by beamsplitter 14, the opaque area 30a removes the low-resolution background illumination and allows the high-resolution AOI illumination information to be inset by transparent area 32a into the same portion of the total image. This combined blended illumination information is projected by the subsequent portions of system 10. Hitherto, the opaque area 30a and transparent area 32a have been substantially in the center of the intermediate image filters 30/32 and these filters have been positionally fixed with respect to beamsplitter 14, so that the optically-blended image required that the subsequent projection system be slewed in a servo-tracked manner to provide a dynamically changing blended image. This placed a relatively high burden on the drive system (e.g. the elevation and azimuth drive-sense means 20a/20b) utilized to move projection head means 18. Here, I achieve image combination in the same manner, but with each of the background intermediate image filter 30 and inset image filter 32 having only a relatively small complimentary area (area 30a in filter 30 and area 32a in filter 32) which are moved in unison by a blend translation drive/sense means 34. Plus, if an area of high-resolution information is to be inset, for example, in the upper left corner of the scene (because the user's eyes and head have slewed to that upper left corner), the entire projection head 18 need not be so slewed, but rather the opaque obscuration area 30a of the background image filter can be moved to the upper left corner (as shown in FIG. 2b) by the blend translation drive sense means 34, removing the low-definition information in that area. Simultaneously, the high-definition image filter mask element 32 is also moved so that its transparent area 32a is centered on the same portion of the relative screen, by mechanical connection to means 34, and by movement in the same directions of arrows E. It will be seen that while the obscuration of a small portion of a low-definition image can be adequately carried out by two-dimensional movement of the masking image filter 30, insertion of high-definition information at a particular location cannot be carried out by mere movement of a spot-transmissive masking filter 32 alone. The high-definition information input through spot 32a must closely track that spot; normally this would require placing AOI inset projector means 12 with its lens means 12a at a fixed location with respect to mask area 32a, so that the entire bulk of means 12 must be translated along with filter mask 32. However, I have found that the inset projector means 12 can be maintained in a fixed location, by installing the fiber-optic element 28 to have its input surface 28a, at its proximal end 28b, receive the illumination output from projector lens 12a, and with the fibers 28f flexibly connecting proximal end 28b to distal end 28c, so that the output surface 28d can be placed at the proper fixed location with respect to image mask transparent area 32a, and fixedly maintained thereat by a holding means 30. It will be seen that the translucent area 32a of the inset mask 32 can be translated, as shown by arrows E, to anyplace within the inset plane (e.g. the input plane to the bottom surface of beamsplitter 14) with movement only of the distal end of fiber-optic cable 28 and without movement either of the proximal end of that cable or of the inset projector means 12. Thus, the inset mask is fixed at the image plane of the fiber-optic element output, whereas the background mask is placed at an intermediate image plane prior to the combining optics. Since the inset image can be moved laterally (i.e. in the same plane as the image plane), the inset can move within the background field of view without suffering any relative geometry changes, such as keystoning or magnification. Thus, the background image mask can be moved in its own image plane in a one-for-one manner with the inset image. The optical blend provided by this approach is capable of being moved throughout the entire background field-of-view with the blend quality remaining identical to a baseline blend, with the exception of any displacement errors between the background and inset masks occurring during movement. As the masks are relatively small in size, and have a limited displacement range, a high degree of accuracy can be achieved at relatively low cost with relatively simple servo control. The relative displacement of the masks may be imperceptible to the system user. The small size and displacement of the insetting mechanism allows for higher rates and accelerations to be achieved, particularly in comparison with conventional gimbal slewing projection optics. I presently prefer a configuration in which the combined background/inset field of views are slewed together at head-tracked rates and accelerations, and the inset is displaced relative to the background at eye-tracked rates and accelerations; this provides a cost effective solution to the problem to achieving high-resolution inset rates and accelerations greater than the current state of the art. It will be understood that, while areas 30a/32a and surrounds 30b/32b are shown with elliptical shape, other shapes can be equally as well utilized.

Referring now to FIGS. 3 and 3a, a portion 40 of a projection system allows multiple video inputs, from each of a plurality of projection means 41, 42 and/or 43, to be combined to provide additional resolution, brightness and/or projected field-of-view. It is well known to the art to utilize classical optical methods (e.g. masks in conjunction with beamsplitters and the like) to combine several images containing different information, from different sources (e.g. video channels), for output to a common objective lens. In projection systems where such multiple image output through a common objective lens is required, optical throughput efficiency is typically reduced by a factor of 50 percent for each 1:1 image combination. As an example, data for forming the indicia "J" is provided at a first projector data input 41a, while data for forming the indicia "H" is provided at data input 42a of a second projector means, and data for forming the letter "M" is provided at the input 43a of the third projector means. The J/H/M illumination patterns are provided at the respective projector output means 41a/42a/43a, to the respective input surfaces 45a/46a/47a of the respective fiber-optic elements 45/46/47. The first cable has a proximal end 45b which can be maintained by a fixing ring element 45c; in a similar manner proximal end 46b or 47b of fiber cable 46 or 47 is maintained by an associated fixing element 46c or 47c. The respective fibers 45f/46f/47f of the respective cables 45/46/47 are combined into a single cable 48, having a distal end 48a which is fixed by a member 48b, so that a common fiber-optic cable end 48c provides a combined output image to a common objective lens means 50. The mosaic of fiber-optic elements are here manufactured in such a manner so that the fiber array output surface 48c provides (see FIG. 3a) the channel images 48ca, 48cb and 48cc adjacent to one another, without requiring the use of beamsplitter devices. It will be seen that the output image can have a portion, e.g. center portion 48cb, which is magnified with respect to the size of its input image; note also that the output of at least the projector (e.g. projectors 41 and 42) can be spatially rotated by imparting a twist in the associated cable (e.g. cable 45 and 46). Also, the various image portions can be physically separated and acted upon in order to magnify, vary the resolution, brightness and/or field-of-view, as required. This may be provided by suitably shaping the input surface (e.g. surface 45a or 46a) to various arcuate formations, in the fiber-optic element input proximal ends. This concept can be further extended to provide variable acuity image mapping in which high-resolution imagery can be concentrated in the center of the viewing area of the area-of-interest projection system, with resulting lower resolution image replaced on the scene periphery. Normally, a linear raster form of system projector can only provide a discrete transition between high-resolution and low-resolution imagery. However, the most effective use of video information for AOI projection system occurs when the resolution through the optical system falls off in gradual radial manner across the projected field-of-view. While variable acuity lens mappings have been attempted using conventional hard optical elements, the results have been less than satisfactory due to limiting color aberrations, luminous fall-off and high manufacturing costs. The fiber-optic element 45–48 allows stretching, tapering, twisting and the like, during manufacturing, so that a multitude of unique and distorted output formats can be achieved. In addition, input and/or output surfaces can be shaped, as by grinding, etching and the like, into concave, convex or compound surfaces, so that a controllable acuity change can be achieved in the fiber-optic element. By coupling such a fiber-optic cable to a linear projection source, a non-linear output image format can be achieved. The fiber-optic element acts as a "zero depth" window so that the output image does not suffer from the color anomalies typically found when using a hard optics approach. A clean, color-corrected image plane will thus be present at the fiber-optic cable output surface and illuminance will fall off in direct proportion to the change in area of the fiber size from input to output.

While several presently preferred embodiments of my novel invention have been set forth herein by way of description, it will now become apparent, to those skilled in the art, that many variations and modifications of an image projection system utilizing fiber-optic cable elements for replacement of various precisely maintained and ground hard optic elements, can be provided. It is my intent, therefore, to be limited only by the scope of the appending claims, and not by the specific details and instrumentalities presented by way of example herein.

What we claim is:

1. A slewable projection system of the type having a relatively high-resolution area-of-interest (AOI) scenic portion inset into and blended with a relatively low-resolution field-of-view scenic portion, comprising:
    at least one means for providing a low-resolution image portion;
    at least one means for providing the high-resolution image portion;
    means for combining the low-resolution and high-resolution image portions;
    means for projecting the combined image onto a viewing area; and
    at least one fiber-optic means for passing combined image information from the combining means to the projecting means.

2. The system of claim 1, wherein one of the fiber-optic means is a cable comprised of a multiplicity of optical fibers.

3. The system of claim 2, wherein each fiber has a first end arranged substantially together with the first ends of all other fibers of the cable into a cable proximal end receiving the combined image optical information, and each fiber has a second end arranged substantially together with the second ends of all other fibers of the cable into a distal end transmitting substantially the same combined image optical information as received by the proximal end.

4. The system of claim 3, wherein at least one of the proximal and distal ends is adapted for spatial movement to re-orient the combined image optical information transmitted from the cable distal end, with respect to the orientation of the same information as received at the cable proximal end.

5. The system of claim 4, wherein the at least one cable end is moved to rotate the orientation of the output information with respect to the orientation of the input information.

6. The system of claim 5, wherein another end of the cable is moved to translate the position of the output information with respect to that means receiving the output information.

7. The system of claim 5, wherein the same end of the cable is moved to translate the position of the output information with respect to that means receiving the output information.

8. The system of claim 1, further comprising: first means for removing a selected portion of the low-resolution image; second means for transmitting only a substantially complementary inset portion of the high-resolution image to match the removed low-resolution image portion; and the fiber-optic means includes a cable formed of a multiplicity of optical fibers each having a first end arranged in a cable proximal end receiving high-resolution information and a second end arranged in a cable distal end transmitting substantially the received information to the image-transmitting portion of said second means.

9. The system of claim 8, further comprising means for causing the location of the removed portion of the low-resolution image to track the location of the inset high-resolution image portion.

10. A slewable projection system of the type having a relatively high-resolution area-of-interest (AOI) scenic portion inset into and blended with a relatively low-resolution field-of-view scenic portion, comprising:
    means for providing the low-resolution image portion;
    first means for removing a select portion of the low-resolution image to provide a modified low-resolution image portion;
    means for providing the high-resolution image portion;
    second means for providing a modified high-resolution image portion by transmitting only a substantially complementary inset portion of the high-resolution image matching the removed low-resolution image portion;
    means for combining the modified low-resolution and modified high-resolution image portions;
    means for projecting the combined image onto a viewing area; and
    fiber-optics means having a proximal end receiving the high-resolution information from said providing means and a distal end transmitting substantially the received information to the image-transmitting portion of said second means.

11. The system of claim 10, further comprising means for causing the location of the removed portion of the low-resolution image to track the location of the inset high-resolution image portion.

* * * * *